(12) United States Patent
Abukawa et al.

(10) Patent No.: US 11,027,522 B2
(45) Date of Patent: Jun. 8, 2021

(54) STEEL SHEET FOR HOT STAMPING

(71) Applicant: NIPPON STEEL CORPORATION, Tokyo (JP)

(72) Inventors: Genki Abukawa, Tokyo (JP); Kunio Hayashi, Tokyo (JP); Kazuo Hikida, Tokyo (JP); Kaoru Kawasaki, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 16/467,295

(22) PCT Filed: Jan. 17, 2017

(86) PCT No.: PCT/JP2017/001358
§ 371 (c)(1),
(2) Date: Jun. 6, 2019

(87) PCT Pub. No.: WO2018/134872
PCT Pub. Date: Jul. 26, 2018

(65) Prior Publication Data
US 2020/0094525 A1    Mar. 26, 2020

(51) Int. Cl.
| | | |
|---|---|---|
| *B32B 15/01* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/06* | (2006.01) | |
| *C22C 38/44* | (2006.01) | |
| *C22C 38/48* | (2006.01) | |
| *C22C 38/50* | (2006.01) | |
| *C22C 38/54* | (2006.01) | |
| *C22C 38/58* | (2006.01) | |

(52) U.S. Cl.
CPC ............ *B32B 15/013* (2013.01); *C21D 6/004* (2013.01); *C21D 6/005* (2013.01); *C21D 6/008* (2013.01); *C21D 8/0205* (2013.01); *C21D 8/0236* (2013.01); *C21D 9/46* (2013.01); *C22C 38/001* (2013.01); *C22C 38/002* (2013.01); *C22C 38/02* (2013.01); *C22C 38/06* (2013.01); *C22C 38/44* (2013.01); *C22C 38/48* (2013.01); *C22C 38/50* (2013.01); *C22C 38/54* (2013.01); *C22C 38/58* (2013.01); *C21D 2211/004* (2013.01); *C21D 2211/008* (2013.01)

(58) Field of Classification Search
CPC ...... B32B 15/013; C21D 6/004; C21D 6/005; C21D 6/008; C21D 6/04; C21D 9/46; C21D 9/48; C21D 2211/004; C21D 2211/008; C21D 2211/002; C21D 8/0463; C21D 8/0473; C21D 8/0405; C21D 8/0426; C21D 8/0436; C22C 38/001; C22C 38/002; C22C 38/02; C22C 38/06; C22C 38/44; C22C 38/48; C22C 38/50; C22C 38/54; C22C 38/58; C22C 38/04; C22C 38/12; C22C 38/14; C22C 38/26; C22C 38/32; C22C 38/22; C22C 38/38; C22C 38/00

See application file for complete search history.

(56) References Cited

U.S. PATENT DOCUMENTS

| | | | |
|---|---|---|---|
| 2011/0048589 A1 | 3/2011 | Matsuda et al. | |
| 2013/0087253 A1 | 4/2013 | Matsuda et al. | |
| 2015/0027602 A1 | 1/2015 | Murakami et al. | |
| 2015/0090377 A1 | 4/2015 | Murakami et al. | |
| 2016/0010171 A1 | 1/2016 | Naitou et al. | |
| 2016/0145704 A1 | 5/2016 | Kawasaki et al. | |
| 2016/0312326 A1* | 10/2016 | Drillet | C23C 2/06 |
| 2018/0100212 A1 | 4/2018 | Ono et al. | |
| 2018/0312947 A1 | 11/2018 | Murakami et al. | |

FOREIGN PATENT DOCUMENTS

| | | | |
|---|---|---|---|
| CN | 101932745 A | 12/2010 | |
| EP | 1975266 A1 | 1/2008 | |
| EP | 3020845 A1 | 5/2016 | |
| JP | 2002-356747 A | 12/2002 | |
| JP | 2013-185243 A | 9/2013 | |
| JP | 5287770 B2 | 9/2013 | |
| JP | 5402191 B2 | 1/2014 | |
| JP | 2014-19941 A | 2/2014 | |
| JP | 2014-118613 A | 6/2014 | |
| JP | 2014-161854 A | 9/2014 | |
| JP | 5756773 B2 | 7/2015 | |
| JP | 2016-008312 A | 1/2016 | |
| WO | WO 2015/041159 A1 | 3/2015 | |
| WO | WO-2015041159 A1 * | 3/2015 | ........... C21D 9/0068 |
| WO | WO 2016/152163 A1 | 9/2016 | |

OTHER PUBLICATIONS

International Preliminary Report on Patentability and English translation of the Written Opinion of the International Searching Authority (Forms PCT/IB/326, PCT/IB/338, PCT/IB/373, and PCT/ISA/237) for International Application No. PCT/JP2017/001358, dated Aug. 1, 2019.
"How can you strengthen super strong steel?", The Iron and Steel Institue of Japan, 1982, vol. 68, p. 2595, total 5 pages.
International Search Report for PCT/JP2017/001358 dated Apr. 18, 2017.
Written Opinion of the International Searching Authority for PCT/JP2017/001358 (PCT/ISA/237) dated Apr. 18, 2017.
Extended European Search Report for corresponding European Application No. 17893141.6, dated Apr. 24, 2020.

* cited by examiner

*Primary Examiner* — Daniel J. Schleis
*Assistant Examiner* — Kevin CT Li
(74) *Attorney, Agent, or Firm* — Birch, Stewart, Kolasch & Birch, LLP

(57) ABSTRACT

A steel sheet for hot stamping includes a steel structure represented by an area fraction of bainite, fresh martensite and tempered martensite: 80% or more in total, and a product of a number density (pieces/$\mu m^2$) of carbides and a proportion of carbides precipitated into prior austenite grains in carbides: 0.50 or more.

8 Claims, No Drawings

STEEL SHEET FOR HOT STAMPING

TECHNICAL FIELD

The present invention relates to a steel sheet for hot stamping.

BACKGROUND ART

Conventionally, from the viewpoints of global environmental problems and collision safety performance, automobile structural parts have been required to be thinner and to have higher strength. In order to respond to these requirements, the automobile structural parts for each of which a high-strength steel sheet is used as a raw material have been increasing. Further, as a forming method of the high-strength steel sheet, a method referred to as hot stamping has been known. In the hot stamping, a steel sheet having the C content of about 0.20 mass % to 0.22 mass % is subjected to press forming in a high-temperature region of 700° C. or higher and subjected to hardening in a press die or out the press die. The hot stamping makes it possible to suppress such poor forming as occurs in a cold press because forming is performed in the high-temperature region where strength of the steel sheet decreases. Further, because a structure having martensite as a main phase can be obtained by hardening after forming, the high strength can be obtained. For this reason, a hot stamp formed body having a tensile strength of about 1500 MPa has been widely used worldwide.

However, when the present inventors have conducted a study for further higher strength, it has become clear that a low-stress fracture sometimes occurs in a hot stamp formed body having a tensile strength of 1900 MPa or more. When the hot stamp formed body in which the low-stress fracture occurs is used for the automobile structural parts, there is a possibility that the parts are fractured even in a case of receiving an impact calculated which the parts can resist in a design stage. Accordingly, suppression of the low-stress fracture is very important for securing collision safety of the automobile structural parts. Hitherto, a low-stress fracture of maraging steel has been known, but the low-stress fracture of the hot stamp formed body has not been known.

CITATION LIST

Patent Literature

Patent Literature 1: Japanese Laid-open Patent Publication No. 2014-161854
Patent Literature 2: Japanese Patent No. 5756773
Patent Literature 3: Japanese Patent No. 5402191
Patent Literature 4: Japanese Patent No. 5287770
Patent Literature 5: Japanese Laid-open Patent Publication No. 2014-118613

Non Patent Literature

Non Patent Literature 1: KAWABE Yoshikuni: Tetsu-To-Hagane, 68, (1982), 2595

SUMMARY OF INVENTION

Technical Problem

An object of the present invention is to provide a steel sheet for hot stamping suitable for manufacture of a hot stamp formed body having high strength and being capable of suppressing a low-stress fracture.

Solution to Problem

The present inventors have conducted a study in order to make a cause of occurrence of a low-stress fracture in a hot stamp formed body having a tensile strength of 1900 MPa or more clear. In this study, first, the present inventors have investigated a relationship between a structure and the low-stress fracture of the hot stamp formed body. As a result, it has become clear that the finer a prior $\gamma$ grain is and the fewer a coarse carbide is, the more unlikely it is that the low-stress fracture occurs.

However, conventional hot stamping makes it difficult that miniaturization of the prior $\gamma$ grain and a reduction in the coarse carbide are compatible with each other, and makes it impossible to suppress the low-stress fracture and sufficiently improve a rupture property. That is, for the miniaturization of the prior $\gamma$ grain, decreases in heating temperature and heating time in hot stamping are preferable, but the decreases in heating temperature and heating time lead to a reduction in an amount of dissolution of carbides during heating, and coarse carbides are likely to remain. Conversely, for the reduction in the coarse carbide, increases in heating temperature and heating time in hot stamping are preferable, but the increases in heating temperature and heating time lead to coarse prior $\gamma$ grains.

Thus, in order that the miniaturization of the prior $\gamma$ grain and the reduction in the coarse carbide in the hot stamp formed body are compatible with each other, the present inventors have studied an improvement in a structure of a steel sheet to be supplied for the hot stamping. As a result, it has become clear that in order to make the coarse carbides unlikely to remain, ferrite and pearlite likely to contain the coarse carbides are preferably reduced by setting bainite, fresh martensite and tempered martensite as a main phase, and that in order to obtain fine $\gamma$ during heating for the hot stamping, carbides to become nucleation sites of a reverse transformation to $\gamma$ are preferably dispersed finely in the steel sheet. Moreover, it also has become clear that it is preferable that a number density of carbides is high and a proportion of carbides precipitated other than into prior $\gamma$ grain boundaries in carbides is high. By hot stamping a steel sheet having such a structure as described above, a hot stamp formed body very excellent in rupture property has been able to be obtained. In the carbides, iron-based carbides such as cementite and an $\varepsilon$ carbide, and carbides of alloy elements such as TiC and NbC are included. A carbonitride is also included in the carbides.

Thus, the present inventors have further conducted keen studies. As a result, the present inventors have appreciated that a steel sheet suitable for manufacture of a hot stamp formed body including the excellent rupture property can be obtained by performing cold-rolled sheet annealing under predetermined conditions, and based on such an appreciation, have conceived embodiments of the invention to be indicated below.

(1)
A steel sheet for hot stamping includes
a steel structure represented by
an area fraction of bainite, fresh martensite and tempered martensite: 80% or more in total, and
a product of a number density (pieces/$\mu m^2$) of carbides and a proportion of carbides precipitated into prior austenite grains in carbides: 0.50 or more.

(2)

The steel sheet for hot stamping according to (1), wherein a C content is not less than 0.27 mass % nor more than 0.60 mass %.

(3)

The steel sheet for hot stamping according to (1) or (2), wherein a Vickers hardness is 500 Hv or more.

(4)

The steel sheet for hot stamping according to any one of (1) to (3), includes a plating layer.

Advantageous Effects of Invention

According to the present invention, it is possible to obtain a steel sheet for hot stamping suitable for manufacture of a hot stamp formed body having high strength and being capable of suppressing a low-stress fracture.

DESCRIPTION OF EMBODIMENTS

Hereinafter, an embodiment of the present invention will be explained.

First, a steel structure of a steel sheet for hot stamping according to an embodiment of the present invention will be explained. The steel sheet for hot stamping according to this embodiment has a steel structure represented by an area fraction of bainite, fresh martensite and tempered martensite: 80% or more in total, and a product of a number density (pieces/$\mu m^2$) of carbides and a proportion of carbides precipitated into prior austenite grains in carbides: 0.50 or more.

Area Fraction of Bainite, Fresh Martensite and Tempered Martensite: 80% or More in Total The higher the area fraction of bainite, fresh martensite and tempered martensite is, the more likely fine austenite ($\gamma$) is to be obtained during heating for hot stamping, and prior $\gamma$ grains of a hot stamp formed body become fine. Bainite, fresh martensite and tempered martensite are also each referred to as a low-temperature transformation structure. When the area fraction of bainite, fresh martensite and tempered martensite is less than 80% in total, prior $\gamma$ grains of a hot stamp formed body become coarse, and a sufficient rupture property cannot be obtained. Further, as long as the area fraction of bainite, fresh martensite and tempered martensite is 80% or more, an area fraction of pearlite is inevitably less than 20%, coarse carbides are unlikely to be contained in the hot stamp formed body. Accordingly, the area fraction of bainite, fresh martensite and tempered martensite is 80% or more, preferably 90% or more, and more preferably 100% in total. Relatively, an area fraction of ferrite and pearlite is less than 20%, preferably 10% or less, and more preferably 0% in total. A mechanical property of materials depends on a volume fraction of a structure or a phase, but as long as a steel structure is isotropic, the volume fraction is equivalent to the area fraction. Then, the area fraction can be measured more simply than the volume fraction. Therefore, the area fraction is used in the present application.

Product of Number Density (Pieces/$\mu m^2$) of Carbides and Proportion of Carbides Precipitated into Prior $\gamma$ Grains in Carbides: 0.50 or More The carbide becomes a nucleation site of a reverse transformation to $\gamma$, and the higher the number density of carbides is, the more likely the fine $\gamma$ is to be obtained during heating for hot stamping, and the prior $\gamma$ grains of the hot stamp formed body become fine. Because a prior $\gamma$ grain boundary of the steel sheet for hot stamping also becomes the nucleation site, a carbide precipitated into the prior $\gamma$ grain boundary hardly contributes to an increase in the nucleation site, and a carbide precipitated into the prior $\gamma$ grain can become a nucleation site different from that into the prior $\gamma$ grain boundary. Then, when the number density of carbides is set as T (pieces/$\mu m^2$) and the proportion of carbides precipitated into prior $\gamma$ grains in carbides is set as M, the product (T×M) of these being less than 0.50 causes coarse prior $\gamma$ grains of the hot stamp formed body and prevents the sufficient rupture property from being obtained. Accordingly, the product (T×M) is 0.50 or more, preferably 0.60 or more, and more preferably 0.70 or more. An upper limit of the product (T×M) is not limited, but it is difficult to manufacture a steel sheet for hot stamping in which a product (T×M) is more than 10. A grain diameter of the carbide is not limited, but a number ratio of coarse carbides whose grain diameters are each 0.5 $\mu m$ or more is preferably 0.15 or less. The carbides are classified into either the carbide precipitated into the prior $\gamma$ grain or the carbide precipitated to the prior $\gamma$ grain boundary.

A commonly-used steel structure includes, for example, ferrite, pearlite, upper bainite, lower bainite, retained austenite, fresh martensite or tempered martensite, or an arbitrary combination of these. Here, an example of a method of measuring an area fraction of each of these structures or phases will be explained.

In measurement of the area fraction of each of ferrite, pearlite, upper bainite, lower bainite and tempered martensite, a sample is taken from a steel sheet with a cross section parallel to a rolling direction and parallel to a thickness direction being an observation surface. Next, the observation surface is polished and nital etched, and a range from a depth of t/8 to a depth of 3t/8 from the steel sheet surface in setting a thickness of the steel sheet as t is observed at 5000-fold magnification by a field emission scanning electron microscope (FE-SEM). This method allows ferrite, pearlite, upper bainite, lower bainite and tempered martensite to be identified. By making such an observation regarding ten visual fields, the area fraction of each of ferrite, pearlite, upper bainite, lower bainite and tempered martensite can be obtained from an average value of the ten visual fields. As described later, upper bainite, lower bainite and tempered martensite can be distinguished from one another by presence/absence and an extending direction of an iron-based carbide in a lath-shaped crystal grain.

Upper bainite is an aggregation of lath-shaped crystal grains and contains carbides between laths. Lower bainite is an aggregation of lath-shaped crystal grains and contains iron-based carbides each having a major axis of 5 nm or more in the inside thereof. The iron-based carbides contained in lower bainite have a single variant, and the iron-based carbides existing in one crystal grain extend substantially in a single direction. "Substantially single direction" mentioned here means a direction having an angular difference within 5°. Tempered martensite is an aggregation of lath-shaped crystal grains and contains iron-based carbides each having a major axis of 5 nm or more in the inside thereof. However, differently from lower bainite, the iron-based carbides contained in tempered martensite have a plurality of variants, and the iron-based carbides existing in one crystal grain extend in a plurality of directions. Accordingly, tempered martensite and lower bainite can be distinguished depending on whether the direction in which the iron-based carbide extends is plural or single.

In measurement of the area fraction of retained austenite, a sample is taken from the steel sheet, a portion from the steel sheet surface to a depth of t/4 is subjected to chemical polishing, and X-ray diffraction intensity on a surface in a depth of t/4 from the steel sheet surface parallel to a rolled surface is measured. For example, an area fraction Sγ of retained austenite is represented by the following formula.

$$S\gamma = (I_{200f} + I_{220f} + I_{311f})/(I_{200b} + I_{211b}) \times 100$$

($I_{200f}$, $I_{220f}$, $I_{311f}$ indicate intensities of diffraction peaks of (200), (220), and (311) of a face-centered cubic lattice (fcc) phase respectively, and $I_{200b}$ and $I_{211b}$ indicate intensities of diffraction peaks of (200) and (211) of a body-centered cubic lattice (bcc) phase respectively.)

Fresh martensite and retained austenite are not sufficiently corroded by nital etching, and therefore, they can be distinguished from ferrite, pearlite, upper bainite, lower bainite and tempered martensite. Accordingly, the area fraction of fresh martensite can be specified by subtracting the area fraction Sγ of retained austenite from the area fraction of the balance in the FE-SEM observation.

Ferrite is a massive crystal grain, and does not contain a substructure such as lath in the inside thereof. Pearlite is a structure in which ferrite and cementite are alternately layered. For example, the layered ferrite in pearlite is distinguished from the above-described massive ferrite.

The grain diameter of carbide means a circle-equivalent diameter to be obtained from an area of the carbide measured in the observation surface of the sample. A density and a composition of the carbide can be measured by using, for example, a transmission electron microscope (TEM) or an atom probe field ion microscope (AP-FIM) with an analysis function according to energy dispersive X-ray spectrometry (EDX).

Next, a chemical composition of the steel sheet for hot stamping according to the embodiment of the present invention will be explained. As described later, the steel sheet for hot stamping according to the embodiment of the present invention is manufactured through hot rolling, hot-rolled sheet annealing, cold rolling, cold-rolled sheet annealing, and so on. Accordingly, the chemical composition of the steel sheet for hot stamping is in consideration of not only properties of the steel sheet for hot stamping but also these processes. In the following explanation, "%" which is a unit of a content of each of elements contained in the steel sheet for hot stamping means "mass %" unless otherwise stated. The steel sheet for hot stamping according to this embodiment has a chemical composition represented by C: 0.27% to 0.60%, Mn: 0.50% to 5.00%, Si: 2.00% or less, P: 0.030% or less, S: 0.0100% or less, acid-soluble Al (sol. Al): 0.100% or less, N: 0.0100% or less, B: 0.0000% to 0.0050%, Cr: 0.00% to 0.50%, Mo: 0.00% to 0.50%, Ti: 0.000% to 0.100%, Nb: 0.000% to 0.100%, V: 0.000% to 0.100%, Cu: 0.000% to 1.000%, Ni: 0.000% to 1.000%, O: 0.00% to 0.02%, W: 0.0% to 0.1%, Ta: 0.0% to 0.1%, Sn: 0.00% to 0.05%, Sb: 0.00% to 0.05%, As: 0.00% to 0.05%, Mg: 0.00% to 0.05%, Ca: 0.00% to 0.05%, Y: 0.00% to 0.05%, Zr: 0.00% to 0.05%, La: 0.00% to 0.05%, or Ce: 0.00% to 0.05%, and the balance: Fe and impurities. As the impurities, the ones contained in raw materials such as ore and scrap and the ones contained in a manufacturing process are exemplified.

C: 0.27% to 0.60%

C is inexpensive and greatly contributes to an improvement in strength. When the C content is less than 0.27%, sufficient strength, for example, a strength of 1900 MPa or more is unlikely to be obtained unless an expensive element contains. Accordingly, the C content is preferably 0.27% or more, more preferably 0.35% or more, and further preferably 0.40% or more. On the other hand, when the C content is more than 0.60%, delayed fracture resistance of a hot stamp formed body sometimes deteriorates. Further, sufficient workability cannot be obtained, and preforming before hot stamping also sometimes becomes difficult. Accordingly, the C content is preferably 0.60% or less, and more preferably 0.55% or less.

Mn: 0.50% to 5.00%

Mn decreases Ac3 point to improve hardenability of the steel sheet for hot stamping. When the Mn content is less than 0.50%, sufficient hardenability cannot be sometimes obtained. Accordingly, the Mn content is preferably 0.50% or more, and more preferably 1.00% or more. On the other hand, when the Mn content is more than 5.00%, workability of the steel sheet for hot stamping before hardening sometimes deteriorates, and preforming before hardening sometimes becomes difficult. Further, a band-shaped structure caused by segregation of Mn is likely to occur, and toughness of the steel sheet for hot stamping sometimes deteriorates. Accordingly, the Mn content is preferably 5.00 or less.

Si: 2.00% or Less

Si is contained as an impurity in steel, for example. When the Si content is more than 2.00%, Ac3 point is excessively high, and heating for the hardening is to be performed at higher than 1200° C., or conversion treatability of the steel sheet for hot stamping and platability of galvanization sometimes decrease. Accordingly, the Si content is preferably 2.00% or less, and more preferably 1.00% or less. Because Si has action of enhancing the hardenability of the steel sheet for hot stamping, Si may be contained.

P: 0.030% or Less

P is contained as an impurity in steel, for example. P makes the workability of the steel sheet for hot stamping deteriorate, or makes toughness of the hot stamp formed body deteriorate. For this reason, the P content as low as possible is preferable. In particular, when the P content is more than 0.030%, decreases in the workability and the toughness are remarkable. Accordingly, the P content is preferably 0.030% or less.

S: 0.0100% or Less

S is contained as an impurity in steel, for example. S makes formability of the steel sheet for hot stamping deteriorate, or makes the toughness of the hot stamp formed body deteriorate. For this reason, the S content as low as possible is preferable. In particular, when the S content is more than 0.0100%, decreases in the formability and the toughness are remarkable. Accordingly, the S content is preferably 0.0100% or less, and more preferably 0.0050% or less.

Sol. Al: 0.100% or Less

Sol. Al is contained as an impurity in steel, for example. When the sol. Al content is more than 0.100%, Ac3 point is excessively high, and the heating for the hardening is sometimes to be performed at higher than 1200° C. Accordingly, the sol. Al content is preferably 0.100% or less. Because sol. Al has action of making steel sounder by deoxidation, sol. Al may be contained.

N: 0.0100% or Less

N is contained as an impurity in steel, for example. N makes formability of the steel sheet for hot stamping deteriorate. For this reason, the N content as low as possible is preferable. In particular, when the N content is more than 0.0100%, the decrease in the formability is remarkable. Accordingly, the N content is preferably 0.0100% or less.

B, Cr, Mo, Ti, Nb, V, Cu and Ni are optional elements which may be each contained appropriately in the steel sheet for hot stamping within a limit of a predetermined amount.

B: 0.0000% to 0.0050%

B improves the hardenability of the steel sheet for hot stamping. Accordingly, B may be contained. In order to obtain this effect sufficiently, the B content is preferably 0.0001% or more. On the other hand, when the B content is more than 0.0050%, the effect by the above-described action is saturated, resulting in being disadvantage in terms of costs. Accordingly, the B content is preferably 0.005% or less.

Cr: 0.00% to 0.50%

Cr improves the hardenability of the steel sheet for hot stamping. Accordingly, Cr may be contained. In order to obtain this effect sufficiently, the Cr content is preferably 0.18% or more. On the other hand, when the Cr content is more than 0.50%, the workability of the steel sheet for hot stamping before hardening sometimes deteriorates, and the preforming before hardening sometimes becomes difficult. Accordingly, the Cr content is preferably 0.50% or less.

Mo: 0.00% to 0.50%

Mo improves the hardenability of the steel sheet for hot stamping. Accordingly, Mo may be contained. In order to obtain this effect sufficiently, the Mo content is preferably 0.03% or more. On the other hand, when the Mo content is more than 0.50%, the workability of the steel sheet for hot stamping before hardening sometimes deteriorates, and the preforming before hardening sometimes becomes difficult. Accordingly, the Mo content is preferably 0.50% or less.

Ti: 0.000% to 0.100%, Nb: 0.000% to 0.100%, V: 0.000% to 0.100%

Ti, Nb and V are strengthening elements, and contribute to a rise in strength of the steel sheet for hot stamping by precipitate strengthening, fine grain strengthening by growth suppression of ferrite crystal grains, and dislocation strengthening through suppression of recrystallization. In order to obtain this effect sufficiently, any of the Ti content, the Nb content and the V content is preferably 0.01% or more. On the other hand, when the Ti content, the Nb content or the V content is more than 0.100%, precipitation of carbonitrides increases, and the formability sometimes deteriorates. Accordingly, any of the Ti content, the Nb content and the V content is preferably 0.100% or less.

Cu: 0.000% to 1.000%, Ni: 0.000% to 1.000%

Cu and Ni contribute to the improvement in strength. In order to obtain this effect sufficiently, either of the Cu content and the Ni content is preferably 0.01% or more. On the other hand, when the Cu content or the Ni content is more than 1.000%, picklability, weldability, hot workability, and the like sometimes deteriorate. Accordingly, either of the Cu content and the Ni content is preferably 1.000% or less.

That is, B: 0.0000% to 0.0050%, Cr: 0.00% to 0.50%, Mo: 0.00% to 0.50%, Ti: 0.000% to 0.100%, Nb: 0.000% to 0.100%, V: 0.000% to 0.100%, Cu: 0.000% to 1.000%, or Ni: 0.000% to 1.000%, or an arbitrary combination of these is preferably established.

In the steel sheet for hot stamping, the following elements may be each contained intentionally or inevitably within a limit of a predetermined amount. That is, O: 0.001% to 0.02%, W: 0.001% to 0.1%, Ta: 0.001% to 0.1%, Sn: 0.001% to 0.05%, Sb: 0.001% to 0.05%, As: 0.001% to 0.05%, Mg: 0.0001% to 0.05%, Ca: 0.001% to 0.05%, Y: 0.001% to 0.05%, Zr: 0.001% to 0.05%, La: 0.001% to 0.05%, or Ce: 0.001% to 0.05%, or an arbitrary combination of these may be established.

A Vickers hardness of the steel sheet for hot stamping according to this embodiment is not limited, but is preferably 500 Hv or more, and more preferably 550 Hv or more.

According to the embodiment of the present invention, performing appropriate hot stamping makes it possible to obtain a tensile strength of 1900 MPa or more in the hot stamp formed body, and allows a stress in which a fracture occurs to be 1800 MPa or more even when a low-stress fracture occurs. Then, using this hot stamp formed body for automotive parts makes it possible to reduce a weight of a vehicle body with excellent collision safety obtained. For example, in a case where the automotive part for which a steel sheet having a tensile strength of about 500 MPa is used is replaced with the part made of the hot stamp formed body having a tensile strength of about 2500 MPa, when it is assumed that collision safety is a neck property of sheet thickness and the collision safety is in proportion to sheet thickness and steel sheet strength, the tensile strength becomes five times stronger, thereby allowing the sheet thickness to be reduced to ⅕. This sheet thickness reduction brings an enormous effect to a reduction in weight and an improvement in fuel consumption of an automobile.

Next, a manufacturing method of the steel sheet for hot stamping according to the embodiment of the present invention will be explained. In this manufacturing method, casting of steel having the above-described chemical composition, hot rolling of a slab, hot-rolled sheet annealing of a hot-rolled steel sheet, cold rolling of a hot-rolled annealed steel sheet, cold-rolled sheet annealing of a cold-rolled steel sheet, heat treatment of a cold-rolled annealed steel sheet, and the like are performed.

In this example, first, The steel having the above-described chemical composition is refined by a conventional means, and the slab is obtained by continuous casting. It is possible to obtain a steel ingot by casting the steel and obtain a steel slab by subjecting the steel ingot to bloom rolling. From the viewpoint of productivity, the continuous casting is preferable.

A casting speed of the continuous casting is preferably set to less than 2.0 m/min in order to effectively suppress central segregation and V-shaped segregation of Mn. Further, in order to keep cleanliness on a surface of the slab good and secure the productivity, the casting speed is preferably set to 1.2 m/min or more.

Next, the slab or the steel slab from ingot is subjected to the hot rolling. In the hot rolling, from the viewpoint of generating carbides more uniformly, a starting temperature is set to not lower than 1000° C. nor higher than 1300° C. A finishing temperature of the hot rolling is set to not lower than 850° C. nor higher than 1000° C. When the finishing temperature is lower than 850° C., a rolling load becomes excessive. When the finishing temperature is higher than 1000° C., a prior γ grain diameter becomes coarse. A coiling temperature is set to not lower than 400° C. nor higher than 700° C. When the coiling temperature is lower than 400° C., strength of the hot-rolled steel sheet becomes excessive, a rupture and a defective shape are likely to occur during the cold rolling. When the coiling temperature is higher than 700° C., oxides are excessively generated on a surface of the hot-rolled steel sheet, and the picklability decreases.

Thereafter, the hot-rolled steel sheet obtained by the hot rolling is subjected to descaling treatment by pickling or the like. The hot-rolled steel sheet is subjected to the hot-rolled sheet annealing after the descaling treatment. The hot-rolled annealed steel sheet is subjected to the cold rolling after the hot-rolled sheet annealing. It is sufficient that the cold rolling is performed by a conventional means. A reduction ratio in the cold rolling is preferably set to 30% or more from the viewpoint of securing good flatness, and preferably set to 80% or less in order to avoid becoming an excessive load.

Next, the cold-rolled steel sheet obtained by the cold rolling is subjected to the cold-rolled sheet annealing. In the cold-rolled sheet annealing, heating to a first temperature of not lower than Ac3 point nor higher than 1100° C., holding a time (heating time) of not shorter than 1 second nor longer than 1000 seconds at the first temperature, and cooling to a second temperature of −150° C. or lower are performed.

When the first temperature is lower than Ac3 point, carbides do not sufficiently melt and coarse carbides remain, and a number density of carbides after cooling falls short. Accordingly, the first temperature is Ac3 point or higher. When the first temperature is higher than 1100° C., an effect of melting the carbides is saturated, and costs greatly increase wastefully. Further, when the first temperature is higher than 1100° C., a γ grain is likely to be coarse, and a prior γ grain of the hot stamp formed body is also likely to be coarse. Accordingly, the first temperature is preferably 1100° C. or lower. A heating rate to the first temperature is not limited, and for example, is set to 1° C./sec to 5000° C./sec. As a heating method, electric heating by which a heating rate of 100° C./sec or more is likely to be obtained is preferable.

When a heating time is shorter than 1.0 second, the carbides do not sufficiently melt and the coarse carbides remain, and the number density of carbides after cooling falls short. Accordingly, the heating time is 1.0 second or longer. When the heating time is longer than 1000 seconds, the effect of melting the carbides is saturated, and the costs greatly increase wastefully. Further, when the heating time is longer than 1000 seconds, the γ grain is likely to be coarse, and the prior γ grain of the hot stamp formed body is also likely to be coarse. Accordingly, the heating time is preferably 1000 seconds or shorter.

When the second temperature being a cooling stop temperature is higher than −150° C., there is a possibility that retained γ is contained in the cold-rolled annealed steel sheet. When the retained γ is contained in the cold-rolled annealed steel sheet, concentration of solid-solution C to the retained γ makes the carbides unlikely to precipitate sufficiently during the heat treatment after the cold-rolled sheet annealing. Accordingly, the second temperature is −150° C. or lower. During the temperature decrease from the first temperature to the second temperature, an average cooling rate in a temperature zone from the first temperature to 100° C. (first temperature zone) is set to 1000° C./sec or more, and an average cooling rate in a temperature zone from 100° C. to −150° C. is set to 50° C./sec or more. When the average cooling rate in the temperature zone from the first temperature to 100° C. is less than 1000° C./sec, the carbides are likely to precipitate in the prior γ grain boundaries after a martensite transformation. When the average cooling rate in the temperature zone from 100° C. to −150° C. is less than 50° C./sec, the solid-solution C is likely to concentrate in γ during the cooling, and the retained γ is likely to remain.

The cold-rolled sheet annealing may be performed twice or more. The more frequently the cold-rolled sheet annealing is performed, the finer the prior γ grain becomes, which leads to grain refining of the prior γ grains of the hot stamp formed body.

After the cold-rolled sheet annealing, the heat treatment (reheating) of the cold-rolled annealed steel sheet is performed. In this heat treatment, heating to a temperature (heating temperature) of not lower than 100° C. nor higher than 300° C., holding a time (heating time) of not shorter than 10 minutes nor longer than 480 minutes at this temperature, and cooling to a temperature of about room temperature are performed. This heat treatment allows the carbides to be finely dispersed in the prior γ grains.

When the heating temperature is lower than 100° C., the carbides do not sufficiently precipitate. Accordingly, the heating temperature is 100° C. or higher. When the heating temperature is higher than 300° C., the carbides grow coarsely, and the number density of the carbides decreases. Accordingly, the heating temperature is 300° C. or lower. When the heating time is shorter than 10 minutes, the carbides do not sufficiently precipitate. Accordingly, the heating time is 10 minutes or longer. When the heating time is longer than 480 minutes, the carbides grow coarsely, and the number density of the carbides decreases. Accordingly, the heating time is 480 minutes or shorter.

Thus, the steel sheet for hot stamping can be manufactured.

The steel sheet for hot stamping may be subjected to plating. When zinc-based plating is performed as the plating, hot-dip zinc-based plating is preferably performed in a continuous hot-dip galvanizing line from the viewpoint of the productivity. In the above case, annealing may be performed previously to the hot-dip zinc-based plating in the continuous hot-dip galvanizing line, or the zinc-based plating may be performed without performing the annealing while setting soaking temperature to be at low temperatures. Alloying treatment may be performed after the hot-dip zinc-based plating to produce an alloyed hot-dip galvanized steel sheet. The zinc-based plating may be performed by electroplating. As examples of the zinc-based plating, there are exemplified hot-dip galvanizing, alloying hot-dip galvanizing, electrogalvanizing, hot-dip zinc-aluminum alloy plating, electric nickel-zinc alloy plating and electric iron-zinc alloy plating. An adhesion amount for the plating is not particularly limited, and it is sufficient that it is nearly equal to an adhesion amount to a conventional plated steel sheet. The zinc-based plating can be performed on at least a part of a surface of a steel material, but generally, the zinc-based plating of a steel sheet is performed on a single surface of the steel sheet or over both surfaces thereof.

Next, an example of a manufacturing method of the hot stamp formed body using the steel sheet for hot stamping according to the embodiment of the present invention will be explained. In this example, a blank material is formed from the steel sheet for hot stamping according to the embodiment of the present invention, this blank material is subjected to hardening, and forming of the blank material is performed in the act of this hardening.

Formation of Blank Material

The steel sheet for hot stamping is subjected to blanking by shear cutting, laser cutting, punching, or the like to be formed into the blank material. The Vickers hardness of the steel sheet for hot stamping according to this embodiment is, for example, 500 Hv or more. When the Vickers hardness is high, the laser cutting is preferably performed.

Hardening

In the hardening, the blank material is heated to a third temperature of not lower than Ac3 point nor higher than 1000° C. at an average heating rate of 2° C./sec or more, the blank material is held at the third temperature for 0.1 seconds or longer to 3 minutes or shorter, and the blank material is cooled from the third temperature to a fourth temperature of 400° C. or lower. The forming is performed during this cooling, and an average cooling rate is set to 100° C./sec or more in a temperature zone from Ar3 point to 400° C. By holding the blank material at the third temperature, a steel structure when the forming is started becomes a γ single-phase structure, and a main phase of the steel structure becomes martensite during the cooling to the fourth temperature thereafter.

When the third temperature is lower than Ac3 point, ferrite is contained in the steel structure on the occasion of the forming, ferrite grows during the cooling, an area fraction of martensite becomes low, and sufficient strength cannot be sometimes obtained. When the third temperature is higher than 1000° C., the effect is saturated, and γ grains excessively grow, prior γ grains of the hot stamp formed body become coarse, and the low-stress fracture is likely to occur.

When the average heating rate to the third temperature is less than 2° C./sec, the γ grains become coarse during the temperature increase, and the low-stress fracture is likely to occur in the hot stamp formed body. A heating method is not limited, and there are exemplified furnace heating, infrared heating, and electric heating. Among these, the electric heating is the most preferable. This is because the electric heating can achieve the highest average heating rate. The higher the average heating rate is, the finer the γ grain is likely to be made, which allowing high productivity to be obtained.

When the holding time at the third temperature is shorter than 0.1 seconds, a reverse transformation to γ falls short, and it is sometimes difficult to obtain the sufficient tensile strength, for example, the tensile strength of 1900 MPa or more. On the other hand, when the holding time is 3 minutes or longer, the γ grains become coarse, and the low-stress fracture is likely to occur in the hot stamp formed body.

When the fourth temperature is higher than 400° C., the hardening is insufficient, and martensite of the hot stamp formed body falls short. During the cooling to the fourth temperature, the average cooling rate is set to 100° C./sec or more in the temperature zone from Ar3 point to 400° C. When the average cooling rate in this temperature zone is less than 100° C./sec, a ferrite transformation, a pearlite transformation or a bainite transformation occurs, the steel structure whose main phase is martensite cannot be obtained, and the sufficient strength cannot be sometimes obtained. At Ar3 point or higher, because a phase transformation such as the ferrite transformation does not occur, the average cooling rate is not limited. For example, even in a temperature zone of Ar3 point or higher, the average cooling rate may be set to 100° C./sec or more.

An upper limit of a cooling rate from the third temperature to the fourth temperature is not limited, but it is common that the cooling rate is industrially 2000° C./sec or less even though a special device for cooling is used. The cooling rate is, roughly, 1000° C./sec or less in simple water cooling and 500° C./sec or less in simple die cooling.

In a temperature zone from the third temperature to 700° C., air cooling accompanying transportation of the blank material may be performed. The cooling of the blank material from the third temperature to the fourth temperature is performed in a die. The blank material may be cooled by heat removal from the die, or the blank material may be cooled by spraying water on the blank material in the die.

A cooling rate in a temperature zone of 400° C. or lower is not limited. When an average cooling rate in the temperature zone of 400° C. or lower is less than 100° C./sec, tempered martensite or bainite inside which fine carbides have precipitated can be obtained, and about several % of retained γ can be obtained. These contribute to an improvement in ductility. In order to set the average cooling rate to less than 100° C./sec, for example, pressing is performed with a die heated to a temperature between from room temperature to 400° C., or when a temperature becomes a temperature of 400° C. from room temperature, the steel sheet is taken from a press machine, and the cooling rate is intentionally reduced. When the average cooling rate in the temperature zone of 400° C. or lower is 100° C./sec or more, a martensite single structure can be obtained, generation of carbides in martensite is suppressed, and particularly high strength can be obtained.

Thus, the hot stamp formed body can be manufactured.

Note that Ac3 point (° C.) and Ar3 point (° C.) can be calculated by the following expressions. Here, [X] indicates the content (mass %) of an element X.

$$AC3 \text{ point}=910-203\sqrt{[C]}-30 \text{ [Mn]}-11 \text{ [Cr]}+ 44.7 \text{ [Si]}+400 \text{ [Al]}+700 \text{ [P]}-15.2 \text{ [Ni]}-20 \text{ [Cu]}+ 400 \text{ [Ti]}+104 \text{ [V]}+31.5 \text{ [Mo]}$$

$$Ar3 \text{ point}=901-325 \text{ [C]}+33 \text{ [Si]}-92 \text{ ([Mn]+[Ni]/2+ [Cr]/2+[Cu]/2+[Mo]/2)}$$

After taking the hot stamp formed body from the die, the hot stamp formed body may be heated within 6 hours at a temperature of 50° C. to 650° C. When the temperature of this heating is 50° C. to 400° C., fine carbides precipitate into martensite during the heating, and the delayed fracture resistance and the mechanical property improve. When the temperature of this heating is 400° C. to 650° C., alloy carbides or intermetallic compounds, or both of these precipitate during the heating, and the strength is increased by particle dispersion strengthening.

Note that the above-described embodiment merely illustrates concrete examples of implementing the present invention, and the technical scope of the present invention is not to be construed in a restrictive manner by these embodiments. That is, the present invention may be implemented in various forms without departing from the technical spirit or main features thereof.

EXAMPLE

Next, examples of the present invention will be explained. Conditions in examples are condition examples employed for confirming the applicability and effects of the present invention and the present invention is not limited to these examples. The present invention can employ various conditions as long as the object of the present invention is achieved without departing from the spirit of the present invention.

First Experiment

Hot-rolled steel sheets were obtained by performing hot rolling of slabs having chemical compositions presented in Table 1. The balance of each of the chemical compositions presented in Table 1 is Fe and impurities. In the hot rolling, a starting temperature was set to 1200° C., a finishing temperature was set to 900° C., and a coiling temperature was set to 600° C. In cooling from the finishing temperature to the coiling temperature, an average cooling rate was set to 20° C./sec. Thereafter, the hot-rolled steel sheets were subjected to descaling treatment by pickling, and cold rolling at a reduction ratio of 60% was performed, and cold-rolled steel sheets each having a thickness of 1.6 mm were obtained. Next, cold-rolled sheet annealing of the cold-rolled steel sheets was performed in electric heating equipment. Table 2 presents conditions of the cold-rolled sheet annealing. A first temperature zone in Table 2 is a temperature zone from a heating temperature to 100° C., and a second temperature zone is a temperature zone from 100° C. to a cooling stop temperature. In the cold-rolled sheet annealing, an average heating rate to the heating temperature was set to 500° C./sec. Heat treatment (reheating) of cold-rolled annealed steel sheets was performed after the cold-rolled sheet annealing. Table 2 also presents conditions of this heat treatment.

After this heat treatment, the cold-rolled annealed steel sheets were subjected to hot-dip aluminum plating, hot-dip galvanizing, or alloying hot-dip galvanizing. When alloyed hot-dip galvanized steel sheets were manufactured, alloying treatment at 550° C. after holding was performed, and cooling to room temperature and coiling were performed. Thus, as steel sheets for hot stamping, the hot-rolled steel sheet, the cold-rolled steel sheets, the aluminum-plated steel sheets, the hot-dip galvanized steel sheets and the alloyed hot-dip galvanized steel sheets were prepared.

Thereafter, the steel sheets for hot stamping were subjected to blanking to be formed into blank materials, and hardening of the blank materials was performed. The hardening was performed under either a condition A or a condition B being the next two conditions. Under the condition A, heating to 900° C. at an average heating rate of 10° C./sec by atmosphere heating, holding at 900° C. for two minutes, air cooling to 700° C., and die cooling from 700° C. to 100° C. at an average cooling rate of 100° C./sec were performed. Under the condition B, rapid heating to 900° C. at an average heating rate of 100° C./s by electric heating, holding at 900° C. for one second, air cooling to 700° C., and die cooling from 700° C. to 100° C. at an average cooling rate of 100° C./s were performed. Thus, various hot stamp formed bodies were manufactured. Underlines in Table 1 to Table 3 indicate that numerical values thereon deviate from ranges of the present invention.

TABLE 1

| MARK OF STEEL | CHEMICAL COMPOSITION (MASS %) | | | | | | | | | | | | | Ac3 POINT (° C.) | Ar3 POINT (° C.) |
|---|---|---|---|---|---|---|---|---|---|---|---|---|---|---|---|
| | C | Si | Al | Mn | P | S | N | Cr | B | Ti | Ni | Nb | Mo | | |
| a | 0.26 | 1.00 | 0.020 | 2.15 | 0.010 | 0.0013 | 0.0033 | 0.10 | 0.0010 | | 0.30 | 0.030 | | 790 | 633 |
| b | 0.26 | 0.90 | 0.030 | 3.20 | 0.006 | 0.0016 | 0.0016 | | 0.0010 | 0.03 | | 0.030 | 0.30 | 779 | 538 |
| c | 0.27 | 0.32 | 0.029 | 1.63 | 0.022 | 0.0003 | 0.0034 | | | | | | | 788 | 674 |
| d | 0.30 | 0.52 | 0.040 | 2.33 | 0.028 | 0.0022 | 0.0026 | 0.30 | | 0.05 | 0.73 | | | 794 | 559 |
| e | 0.36 | 0.63 | 0.062 | 1.59 | 0.006 | 0.0037 | 0.0039 | 0.41 | 0.0010 | | | 0.084 | | 784 | 640 |
| f | 0.40 | 0.82 | 0.085 | 1.62 | 0.012 | 0.0027 | 0.0031 | 0.20 | | | 0.89 | | 0.38 | 811 | 581 |
| g | 0.46 | 1.30 | 0.016 | 0.66 | 0.016 | 0.0330 | 0.0024 | 0.42 | | | | 0.055 | 0.49 | 829 | 692 |
| h | 0.59 | 0.22 | 0.061 | 2.30 | 0.006 | 0.0016 | 0.0016 | | 0.0021 | 0.04 | | 0.055 | 0.38 | 742 | 487 |

TABLE 2

| TEST No. | MARK OF STEEL | STEEL TYPE | COLD-ROLLED SHEET ANNEALING | | | | | | HEAT TREATMENT (REHEATING) | | HARDENING CONDITION | REMARK |
|---|---|---|---|---|---|---|---|---|---|---|---|---|
| | | | Ac3 POINT (° C.) | HEATING TEMPERATURE (° C.) | HEATING TIME (sec) | COOLING STOP TEMPERATURE (° C.) | AVERAGE COOLING RATE IN FIRST TEMPERATURE ZONE (° C./sec) | AVERAGE COOLING RATE IN SECOND TEMPERATURE ZONE (° C./sec) | REHEATING TEMPERATURE (° C.) | REHEATING TIME (min) | | |
| 1 | a | COLD-ROLLED STEEL SHEET | 790 | 903 | 10 | −176 | 1931 | 77 | 111 | 88 | B | FOR INVENTION EXAMPLE |
| 2 | b | COLD-ROLLED STEEL SHEET | 779 | 905 | 10 | −175 | 2078 | 137 | 171 | 30 | B | FOR INVENTION EXAMPLE |
| 3 | c | COLD-ROLLED STEEL SHEET | 788 | 900 | 10 | −180 | 2301 | 126 | 290 | 15 | B | FOR INVENTION EXAMPLE |

TABLE 2-continued

| TEST No. | MARK OF STEEL | STEEL TYPE | COLD-ROLLED SHEET ANNEALING | | | | | | HEAT TREATMENT (REHEATING) | | | REMARK |
|---|---|---|---|---|---|---|---|---|---|---|---|---|
| | | | Ac3 POINT (° C.) | HEATING TEMPERATURE (° C.) | HEATING TIME (sec) | COOLING STOP TEMPERATURE (° C.) | AVERAGE COOLING RATE IN FIRST TEMPERATURE ZONE (° C./sec) | AVERAGE COOLING RATE IN SECOND TEMPERATURE ZONE (° C./sec) | REHEATING TEMPERATURE (° C.) | REHEATING TIME (min) | HARDENING CONDITION | |
| 4 | d | COLD-ROLLED STEEL SHEET | 794 | 901 | 10 | −175 | 2360 | 108 | 147 | 64 | B | FOR INVENTION EXAMPLE |
| 5 | e | COLD-ROLLED STEEL SHEET | 784 | 901 | 5 | −177 | 2032 | 135 | 116 | 77 | B | FOR INVENTION EXAMPLE |
| 6 | f | COLD-ROLLED STEEL SHEET | 811 | 904 | 1 | −178 | 1963 | 55 | 172 | 63 | B | FOR INVENTION EXAMPLE |
| 7 | g | COLD-ROLLED STEEL SHEET | 829 | 902 | 10 | −177 | 2011 | 101 | 115 | 65 | B | FOR INVENTION EXAMPLE |
| 8 | g | COLD-ROLLED STEEL SHEET | 829 | 750 | 10 | −179 | 2022 | 130 | 173 | 86 | B | FOR COMPARATIVE EXAMPLE |
| 9 | g | COLD-ROLLED STEEL SHEET | 829 | 901 | 0.5 | −176 | 2238 | 123 | 175 | 87 | B | FOR COMPARATIVE EXAMPLE |
| 10 | g | COLD-ROLLED STEEL SHEET | 829 | 904 | 4900 | −180 | 1050 | 124 | 136 | 42 | B | FOR INVENTION EXAMPLE |
| 11 | g | COLD-ROLLED STEEL SHEET | 829 | 902 | 100 | −150 | 1080 | 109 | 153 | 107 | B | FOR INVENTION EXAMPLE |
| 12 | g | COLD-ROLLED STEEL SHEET | 829 | 902 | 100 | −130 | 1080 | 109 | 153 | 107 | B | FOR COMPARATIVE EXAMPLE |
| 13 | g | COLD-ROLLED STEEL SHEET | 829 | 905 | 10 | −177 | 950 | 114 | 105 | 80 | A | FOR COMPARATIVE EXAMPLE |
| 14 | g | COLD-ROLLED STEEL SHEET | 829 | 903 | 10 | −178 | 2371 | 45 | 104 | 43 | A | FOR COMPARATIVE EXAMPLE |
| 15 | g | COLD-ROLLED STEEL SHEET | 829 | 904 | 10 | −176 | 2246 | 112 | 95 | 46 | A | FOR COMPARATIVE EXAMPLE |
| 16 | g | COLD-ROLLED STEEL SHEET | 829 | 902 | 10 | −178 | 2242 | 96 | 310 | 33 | A | FOR COMPARATIVE EXAMPLE |
| 17 | g | COLD-ROLLED STEEL SHEET | 829 | 902 | 10 | −175 | 2355 | 130 | 148 | 9 | A | FOR COMPARATIVE EXAMPLE |
| 18 | g | COLD-ROLLED STEEL SHEET | 829 | 902 | 10 | −176 | 2213 | 109 | 114 | 500 | A | FOR COMPARATIVE EXAMPLE |
| 19 | g | COLD-ROLLED STEEL SHEET | 829 | 900 | 10 | −178 | 1030 | 122 | ABSENCE | | A | FOR COMPARATIVE EXAMPLE |
| 20 | h | COLD-ROLLED STEEL SHEET | 742 | 901 | 10 | −177 | 2001 | 122 | 149 | 78 | A | FOR INVENTION EXAMPLE |

TABLE 2-continued

| | | | | COLD-ROLLED SHEET ANNEALING | | | | | HEAT TREATMENT (REHEATING) | | | |
|---|---|---|---|---|---|---|---|---|---|---|---|---|
| TEST No. | MARK OF STEEL | STEEL TYPE | Ac3 POINT (° C.) | HEAT-ING TEMPER-ATURE (° C.) | HEAT-ING TIME (sec) | COOL-ING STOP TEMPER-ATURE (° C.) | AVERAGE COOLING RATE IN FIRST TEMPER-ATURE ZONE (° C./sec) | AVERAGE COOLING RATE IN SECOND TEMPER-ATURE ZONE (° C./sec) | RE-HEAT-ING TEMPER-ATURE (° C.) | RE-HEAT-ING TIME (min) | HAR-DEN-ING CON-DITION | REMARK |
| 21 | g | ALUMINUM-PLATED STEEL SHEET | 829 | 901 | 150 | −178 | 2033 | 122 | 127 | 76 | A | FOR INVENTION EXAMPLE |
| 22 | g | ALUMINUM-PLATED STEEL SHEET | 829 | 903 | 150 | −177 | 1969 | 106 | 177 | 53 | A | FOR INVENTION EXAMPLE |
| 23 | g | ALUMINUM-PLATED STEEL SHEET | 829 | 903 | 150 | −180 | 2268 | 100 | 119 | 52 | A | FOR INVENTION EXAMPLE |
| 24 | g | ALUMINUM-PLATED STEEL SHEET | 829 | 750 | 150 | −180 | 2268 | 100 | 119 | 52 | A | FOR COMPARA-TIVE EXAMPLE |
| 25 | g | ALUMINUM-PLATED STEEL SHEET | 829 | 903 | 0.5 | −180 | 2268 | 100 | 119 | 52 | A | FOR COMPARA-TIVE EXAMPLE |
| 26 | g | ALUMINUM-PLATED STEEL SHEET | 829 | 903 | 150 | −130 | 2268 | 100 | 119 | 52 | A | FOR COMPARA-TIVE EXAMPLE |
| 27 | g | ALUMINUM-PLATED STEEL SHEET | 829 | 903 | 150 | −180 | 950 | 100 | 119 | 52 | A | FOR COMPARA-TIVE EXAMPLE |
| 28 | g | ALUMINUM-PLATED STEEL SHEET | 829 | 903 | 150 | −180 | 2268 | 45 | 119 | 52 | A | FOR COMPARA-TIVE EXAMPLE |
| 29 | g | ALUMINUM-PLATED STEEL SHEET | 829 | 903 | 150 | −180 | 2268 | 100 | 95 | 52 | A | FOR COMPARA-TIVE EXAMPLE |
| 30 | g | ALUMINUM-PLATED STEEL SHEET | 829 | 903 | 150 | −180 | 2268 | 100 | 310 | 52 | A | FOR COMPARA-TIVE EXAMPLE |
| 31 | g | ALUMINUM-PLATED STEEL SHEET | 829 | 903 | 150 | −180 | 2268 | 100 | 119 | 9 | A | FOR COMPARA-TIVE EXAMPLE |
| 32 | g | ALUMINUM-PLATED STEEL SHEET | 829 | 903 | 150 | −180 | 2268 | 100 | 119 | 500 | A | FOR COMPARA-TIVE EXAMPLE |
| 33 | g | HOT-DIP GALVANIZED STEEL SHEET | 829 | 904 | 150 | −180 | 2059 | 135 | 103 | 50 | A | FOR INVENTION EXAMPLE |
| 34 | g | HOT-DIP GALVANIZED STEEL SHEET | 829 | 904 | 150 | −179 | 2054 | 138 | 158 | 95 | A | FOR INVENTION EXAMPLE |

TABLE 3

| | | | | COLD-ROLLED SHEET ANNEALING | | | | | HEAT TREATMENT (REHEATING) | | | |
|---|---|---|---|---|---|---|---|---|---|---|---|---|
| TEST No. | MARK OF STEEL | STEEL TYPE | Ac3 POINT (° C.) | HEATING TEMPERATURE (° C.) | HEATING TIME (sec) | COOLING STOP TEMPERATURE (° C.) | AVERAGE COOLING RATE IN FIRST TEMPERATURE ZONE (° C./sec) | AVERAGE COOLING RATE IN SECOND TEMPERATURE ZONE (° C./sec) | REHEATING TEMPERATURE (° C.) | REHEATING TIME (min) | HARDENING CONDITION | REMARK |
| 35 | g | HOT-DIP GALVANIZED STEEL SHEET | 829 | 903 | 150 | −177 | 1945 | 139 | 127 | 63 | A | FOR INVENTION EXAMPLE |
| 36 | g | HOT-DIP GALVANIZED STEEL SHEET | 829 | 750 | 150 | −177 | 1945 | 139 | 127 | 63 | A | FOR COMPARATIVE EXAMPLE |
| 37 | g | HOT-DIP GALVANIZED STEEL SHEET | 829 | 903 | 0.5 | −177 | 1945 | 139 | 127 | 63 | A | FOR COMPARATIVE EXAMPLE |
| 38 | g | HOT-DIP GALVANIZED STEEL SHEET | 829 | 903 | 150 | −130 | 1945 | 139 | 127 | 63 | A | FOR COMPARATIVE EXAMPLE |
| 39 | g | HOT-DIP GALVANIZED STEEL SHEET | 829 | 903 | 150 | −177 | 950 | 139 | 127 | 63 | A | FOR COMPARATIVE EXAMPLE |
| 40 | g | HOT-DIP GALVANIZED STEEL SHEET | 829 | 903 | 150 | −177 | 1945 | 45 | 127 | 63 | A | FOR COMPARATIVE EXAMPLE |
| 41 | g | HOT-DIP GALVANIZED STEEL SHEET | 829 | 903 | 150 | −177 | 1945 | 139 | 95 | 63 | A | FOR COMPARATIVE EXAMPLE |
| 42 | g | HOT-DIP GALVANIZED STEEL SHEET | 829 | 903 | 150 | −177 | 1945 | 139 | 310 | 63 | A | FOR COMPARATIVE EXAMPLE |
| 43 | g | HOT-DIP GALVANIZED STEEL SHEET | 829 | 903 | 150 | −177 | 1945 | 139 | 127 | 9 | A | FOR COMPARATIVE EXAMPLE |
| 44 | g | HOT-DIP GALVANIZED STEEL SHEET | 829 | 903 | 150 | −177 | 1945 | 139 | 127 | 500 | A | FOR COMPARATIVE EXAMPLE |
| 45 | g | ALLOYED HOT-DIP GALVANIZED STEEL SHEET | 829 | 901 | 150 | −176 | 2168 | 101 | 112 | 57 | A | FOR INVENTION EXAMPLE |
| 46 | g | ALLOYED HOT-DIP GALVANIZED STEEL SHEET | 829 | 902 | 150 | −176 | 1956 | 98 | 145 | 108 | A | FOR INVENTION EXAMPLE |
| 47 | g | ALLOYED HOT-DIP GALVANIZED STEEL SHEET | 829 | 901 | 150 | −175 | 2085 | 129 | 146 | 84 | A | FOR INVENTION EXAMPLE |
| 48 | g | ALLOYED HOT-DIP GALVANIZED STEEL SHEET | 829 | 750 | 150 | −175 | 2085 | 129 | 146 | 84 | A | FOR COMPARATIVE EXAMPLE |
| 49 | g | ALLOYED HOT-DIP GALVANIZED STEEL SHEET | 829 | 901 | 0.5 | −175 | 2085 | 129 | 146 | 84 | A | FOR COMPARATIVE EXAMPLE |

TABLE 3-continued

|  |  |  | COLD-ROLLED SHEET ANNEALING | | | | | HEAT TREATMENT (REHEATING) | | | |
|---|---|---|---|---|---|---|---|---|---|---|---|
| TEST No. | MARK OF STEEL | STEEL TYPE | Ac3 POINT (° C.) | HEAT-ING TEMPER-ATURE (° C.) | HEAT-ING TIME (sec) | COOL-ING STOP TEMPER-ATURE (° C.) | AVERAGE COOLING RATE IN FIRST TEMPER-ATURE ZONE (° C./sec) | AVERAGE COOLING RATE IN SECOND TEMPER-ATURE ZONE (° C./sec) | RE-HEAT-ING TEMPER-ATURE (° C.) | RE-HEAT-ING TIME (min) | HAR-DEN-ING CON-DITION | REMARK |
| 50 | g | ALLOYED HOT-DIP GALVANIZED STEEL SHEET | 829 | 901 | 150 | −130 | 2085 | 129 | 146 | 84 | A | FOR COMPARA-TIVE EXAMPLE |
| 51 | g | ALLOYED HOT-DIP GALVANIZED STEEL SHEET | 829 | 901 | 150 | −175 | 950 | 129 | 146 | 84 | A | FOR COMPARA-TIVE EXAMPLE |
| 52 | g | ALLOYED HOT-DIP GALVANIZED STEEL SHEET | 829 | 901 | 150 | −175 | 2085 | 45 | 146 | 84 | A | FOR COMPARA-TIVE EXAMPLE |
| 53 | g | ALLOYED HOT-DIP GALVANIZED STEEL SHEET | 829 | 901 | 150 | −175 | 2085 | 129 | 95 | 84 | A | FOR COMPARA-TIVE EXAMPLE |
| 54 | g | ALLOYED HOT-DIP GALVANIZED STEEL SHEET | 829 | 901 | 150 | −175 | 2085 | 129 | 310 | 84 | A | FOR COMPARA-TIVE EXAMPLE |
| 55 | g | ALLOYED HOT-DIP GALVANIZED STEEL SHEET | 829 | 901 | 150 | −175 | 2085 | 129 | 146 | 9 | A | FOR COMPARA-TIVE EXAMPLE |
| 56 | g | ALLOYED HOT-DIP GALVANIZED STEEL SHEET | 829 | 901 | 150 | −175 | 2085 | 129 | 146 | 500 | A | FOR COMPARA-TIVE EXAMPLE |
| 57 | h | COLD-ROLLED STEEL SHEET | 829 | 902 | 10 | −177 | 2011 | 101 | 115 | 65 | A | FOR INVENTION EXAMPLE |
| 58 | h | COLD-ROLLED STEEL SHEET | 829 | 901 | 5 | −177 | 2032 | 135 | 115 | 65 | A | FOR INVENTION EXAMPLE |
| 59 | h | COLD-ROLLED STEEL SHEET | 829 | 904 | 1 | −178 | 1963 | 55 | 115 | 65 | A | FOR INVENTION EXAMPLE |
| 60 | h | ALUMINUM-PLATED STEEL SHEET | 829 | 903 | 150 | −177 | 1969 | 106 | 115 | 65 | A | FOR INVENTION EXAMPLE |
| 61 | h | ALUMINUM-PLATED STEEL SHEET | 829 | 901 | 5 | −178 | 2033 | 122 | 115 | 65 | A | FOR INVENTION EXAMPLE |
| 62 | h | ALUMINUM-PLATED STEEL SHEET | 829 | 903 | 1 | −180 | 2268 | 100 | 115 | 65 | A | FOR INVENTION EXAMPLE |
| 63 | h | HOT-DIP GALVANIZED STEEL SHEET | 829 | 904 | 150 | −180 | 2059 | 135 | 115 | 65 | A | FOR INVENTION EXAMPLE |
| 64 | h | HOT-DIP GALVANIZED STEEL SHEET | 829 | 904 | 5 | −179 | 2054 | 138 | 115 | 65 | A | FOR INVENTION EXAMPLE |

TABLE 3-continued

| | | | | COLD-ROLLED SHEET ANNEALING | | | | HEAT TREATMENT (REHEATING) | | | |
|---|---|---|---|---|---|---|---|---|---|---|---|
| TEST No. | MARK OF STEEL | STEEL TYPE | Ac3 POINT (° C.) | HEATING TEMPERATURE (° C.) | HEATING TIME (sec) | COOLING STOP TEMPERATURE (° C.) | AVERAGE COOLING RATE IN FIRST TEMPERATURE ZONE (° C./sec) | AVERAGE COOLING RATE IN SECOND TEMPERATURE ZONE (° C./sec) | REHEATING TEMPERATURE (° C.) | REHEATING TIME (min) | HARDENING CONDITION | REMARK |
| 65 | h | HOT-DIP GALVANIZED STEEL SHEET | 829 | 903 | 1 | −177 | 1945 | 139 | 115 | 65 | A | FOR INVENTION EXAMPLE |
| 66 | h | ALLOYED HOT-DIP GALVANIZED STEEL SHEET | 829 | 901 | 150 | −176 | 2168 | 101 | 115 | 65 | A | FOR INVENTION EXAMPLE |
| 67 | h | ALLOYED HOT-DIP GALVANIZED STEEL SHEET | 829 | 902 | 5 | −176 | 1956 | 98 | 115 | 65 | A | FOR INVENTION EXAMPLE |
| 68 | h | ALLOYED HOT-DIP GALVANIZED STEEL SHEET | 829 | 901 | 1 | −175 | 2085 | 129 | 115 | 65 | A | FOR INVENTION EXAMPLE |

Steel structures of the steel sheets for hot stamping and steel structures of the hot stamp formed bodies were observed. Table 4 and Table 5 present these results. In the observation of the steel structure of each of the hot stamp formed bodies, a range of a ⅛ to ⅜ thickness centering ¼ of a sheet thickness was observed by FE-SEM. Then, regarding a prior γ grain diameter, the one having 20 μm or less was evaluated to be fine, and the one having more than 20 μm was evaluated to be coarse. Regarding a coarse carbide, in a visual field, the one having 0.15 or less was evaluated to be "absence" and the one having more than 0.15 was evaluated to be "presence", in a number ratio of carbides whose grain diameters are each 0.5 μm or more.

Tensile test pieces in conformity to JIS Z 2201 were taken from the hot stamp formed bodies, and maximum tensile strength was measured by a tensile test in conformity to JIS Z 2241. The tensile test was performed five times for each test No., and an average value of five maximum tensile strengths was set as tensile strength of the test No. Table 4 and Table 5 also present this result. The reason why the average value is set as the tensile strength is that in a case where a low-stress fracture occurs, even though manufacturing conditions are the same, large variation in rupture stress is likely to occur. Regarding certain true strain $\varepsilon_a$ and true stress $\delta_a$, the low-stress fracture was judged as occurring regarding a sample in which a rupture occurred before the following formula 1 was satisfied, and the low-stress fracture was judged as not occurring regarding a sample in which a rupture occurred after the following formula 1 was satisfied. In the formula 1, $\Delta\varepsilon_a$ was set to 0.0002, and $\Delta\delta_a$ was set as a difference between "a true stress $\delta_{a+1}$ when a true strain is "$\varepsilon_a+0.0002$"" and "a true stress $\delta_a$ when a true strain is "$\varepsilon_a$"" ($\Delta\delta_a=\delta_{a+1}-\delta_a$), $$\Delta\delta_a/\Delta\varepsilon_a=\delta_a \quad \text{(formula 1)}.$$

TABLE 4

| | | STEEL SHEET FOR HOT STAMPING | | | | | | |
|---|---|---|---|---|---|---|---|---|
| | | AREA FRACTION (%) | | | | | | |
| TEST No. | MARK OF STEEL | TEMPERED MARTENSITE | FRESH MARTENSITE | BAINITE | TOTAL | NUMBER DENSITY T (pieces/μm²) | PROPORTION M | T × M |
| 1 | a | 100 | 0 | 0 | 100 | 0.7 | 0.8 | 0.56 |
| 2 | b | 100 | 0 | 0 | 100 | 0.7 | 0.8 | 0.56 |
| 3 | c | 100 | 0 | 0 | 100 | 0.6 | 0.9 | 0.54 |
| 4 | d | 100 | 0 | 0 | 100 | 0.7 | 0.8 | 0.56 |
| 5 | e | 100 | 0 | 0 | 100 | 0.6 | 1.0 | 0.60 |
| 6 | f | 100 | 0 | 0 | 100 | 0.7 | 1.0 | 0.70 |
| 7 | g | 100 | 0 | 0 | 100 | 0.7 | 0.9 | 0.63 |
| 8 | g | 20 | 0 | 0 | 20 | 0.5 | 0.5 | 0.25 |
| 9 | g | 70 | 0 | 0 | 70 | 0.5 | 0.4 | 0.20 |
| 10 | g | 100 | 0 | 0 | 100 | 0.8 | 1.0 | 0.80 |
| 11 | g | 100 | 0 | 0 | 100 | 0.8 | 1.0 | 0.80 |
| 12 | g | 100 | 0 | 0 | 100 | 0.4 | 1.0 | 0.40 |
| 13 | g | 100 | 0 | 0 | 100 | 0.8 | 0.5 | 0.40 |

TABLE 4-continued

| Test No. | | | | | | | | Steel Sheet for Hot Stamping Vickers Hardness (Hv) | Hot Stamp Molded Body Coarse Carbide | Prior γ Grain | Tensile Strength | Vickers Hardness (Hv) | Low Fracture Stress | Remark |
|---|---|---|---|---|---|---|---|---|---|---|---|---|---|---|
| 14 | g | 100 | 0 | 0 | 100 | 0.5 | 0.8 | 0.40 | | | | | | |
| 15 | g | 100 | 0 | 0 | 100 | 0.4 | 0.8 | 0.32 | | | | | | |
| 16 | g | 100 | 0 | 0 | 100 | 0.5 | 0.9 | 0.45 | | | | | | |
| 17 | g | 100 | 0 | 0 | 100 | 0.4 | 0.8 | 0.32 | | | | | | |
| 18 | g | 100 | 0 | 0 | 100 | 0.5 | 0.9 | 0.45 | | | | | | |
| 19 | g | 80 | 20 | 0 | 100 | 0.3 | 0.9 | 0.27 | | | | | | |
| 20 | h | 100 | 0 | 0 | 100 | 1.0 | 0.9 | 0.90 | | | | | | |
| 21 | g | 100 | 0 | 0 | 100 | 0.9 | 0.8 | 0.72 | | | | | | |
| 22 | g | 100 | 0 | 0 | 100 | 0.9 | 0.8 | 0.72 | | | | | | |
| 23 | g | 100 | 0 | 0 | 100 | 0.9 | 0.9 | 0.81 | | | | | | |
| 24 | g | 20 | 0 | 0 | 20 | 0.4 | 0.5 | 0.20 | | | | | | |
| 25 | g | 70 | 0 | 0 | 70 | 0.5 | 0.4 | 0.20 | | | | | | |
| 26 | g | 100 | 0 | 0 | 100 | 0.4 | 1.0 | 0.40 | | | | | | |
| 27 | g | 100 | 0 | 0 | 100 | 0.7 | 0.5 | 0.35 | | | | | | |
| 28 | g | 100 | 0 | 0 | 100 | 0.5 | 0.8 | 0.40 | | | | | | |
| 29 | g | 100 | 0 | 0 | 100 | 0.5 | 0.8 | 0.40 | | | | | | |
| 30 | g | 100 | 0 | 0 | 100 | 0.5 | 0.9 | 0.45 | | | | | | |
| 31 | g | 100 | 0 | 0 | 100 | 0.4 | 0.8 | 0.32 | | | | | | |
| 32 | g | 100 | 0 | 0 | 100 | 0.5 | 0.9 | 0.45 | | | | | | |
| 33 | g | 100 | 0 | 0 | 100 | 0.9 | 1.0 | 0.90 | | | | | | |
| 34 | g | 100 | 0 | 0 | 100 | 0.8 | 1.0 | 0.80 | | | | | | |
| 1 | | | | | | | | 380 | ABSENCE | FINE | 1910 | 570 | ABSENCE | INVENTION EXAMPLE |
| 2 | | | | | | | | 420 | ABSENCE | FINE | 1920 | 580 | ABSENCE | INVENTION EXAMPLE |
| 3 | | | | | | | | 560 | ABSENCE | FINE | 1940 | 590 | ABSENCE | INVENTION EXAMPLE |
| 4 | | | | | | | | 590 | ABSENCE | FINE | 2000 | 600 | ABSENCE | INVENTION EXAMPLE |
| 5 | | | | | | | | 710 | ABSENCE | FINE | 2380 | 710 | ABSENCE | INVENTION EXAMPLE |
| 6 | | | | | | | | 780 | ABSENCE | FINE | 2630 | 790 | ABSENCE | INVENTION EXAMPLE |
| 7 | | | | | | | | 840 | ABSENCE | FINE | 2650 | 840 | ABSENCE | INVENTION EXAMPLE |
| 8 | | | | | | | | 580 | PRESENCE | COARSE | 1250 | 830 | PRESENCE | COMPARATIVE EXAMPLE |
| 9 | | | | | | | | 630 | PRESENCE | COARSE | 1210 | 840 | PRESENCE | COMPARATIVE EXAMPLE |
| 10 | | | | | | | | 800 | ABSENCE | FINE | 2200 | 820 | ABSENCE | INVENTION EXAMPLE |
| 11 | | | | | | | | 700 | ABSENCE | FINE | 2670 | 850 | ABSENCE | INVENTION EXAMPLE |
| 12 | | | | | | | | 650 | ABSENCE | COARSE | 1670 | 830 | PRESENCE | COMPARATIVE EXAMPLE |
| 13 | | | | | | | | 690 | ABSENCE | COARSE | 1700 | 840 | PRESENCE | COMPARATIVE EXAMPLE |
| 14 | | | | | | | | 700 | ABSENCE | COARSE | 1690 | 850 | PRESENCE | COMPARATIVE EXAMPLE |
| 15 | | | | | | | | 750 | ABSENCE | COARSE | 1680 | 850 | PRESENCE | COMPARATIVE EXAMPLE |
| 16 | | | | | | | | 600 | ABSENCE | COARSE | 1680 | 850 | PRESENCE | COMPARATIVE EXAMPLE |
| 17 | | | | | | | | 700 | ABSENCE | COARSE | 1690 | 840 | PRESENCE | COMPARATIVE EXAMPLE |
| 18 | | | | | | | | 610 | ABSENCE | COARSE | 1680 | 850 | PRESENCE | COMPARATIVE EXAMPLE |
| 19 | | | | | | | | 750 | ABSENCE | COARSE | 1650 | 850 | PRESENCE | COMPARATIVE EXAMPLE |

TABLE 4-continued

| | | | | | | | |
|---|---|---|---|---|---|---|---|
| 20 | 720 | ABSENCE | FINE | 2120 | 880 | PRESENCE | INVENTION EXAMPLE |
| 21 | 770 | ABSENCE | FINE | 2810 | 820 | ABSENCE | INVENTION EXAMPLE |
| 22 | 760 | ABSENCE | FINE | 2800 | 830 | ABSENCE | INVENTION EXAMPLE |
| 23 | 770 | ABSENCE | FINE | 2800 | 830 | ABSENCE | INVENTION EXAMPLE |
| 24 | 590 | PRESENCE | COARSE | <u>1240</u> | 820 | PRESENCE | COMPARATIVE EXAMPLE |
| 25 | 630 | PRESENCE | COARSE | <u>1210</u> | 840 | PRESENCE | COMPARATIVE EXAMPLE |
| 26 | 660 | ABSENCE | COARSE | <u>1670</u> | 830 | PRESENCE | COMPARATIVE EXAMPLE |
| 27 | 690 | ABSENCE | COARSE | <u>1700</u> | 840 | PRESENCE | COMPARATIVE EXAMPLE |
| 28 | 700 | ABSENCE | COARSE | <u>1690</u> | 850 | PRESENCE | COMPARATIVE EXAMPLE |
| 29 | 750 | ABSENCE | COARSE | <u>1680</u> | 850 | PRESENCE | COMPARATIVE EXAMPLE |
| 30 | 610 | ABSENCE | COARSE | <u>1680</u> | 850 | PRESENCE | COMPARATIVE EXAMPLE |
| 31 | 700 | ABSENCE | COARSE | <u>1690</u> | 840 | PRESENCE | COMPARATIVE EXAMPLE |
| 32 | 610 | ABSENCE | COARSE | <u>1670</u> | 840 | PRESENCE | COMPARATIVE EXAMPLE |
| 33 | 760 | ABSENCE | FINE | 2790 | 830 | ABSENCE | INVENTION EXAMPLE |
| 34 | 760 | ABSENCE | FINE | 2810 | 820 | ABSENCE | INVENTION EXAMPLE |

TABLE 5

| | | STEEL SHEET FOR HOT STAMPING | | | | | | |
|---|---|---|---|---|---|---|---|---|
| | | AREA FRACTION (%) | | | | | | VICKERS |
| TEST No. | MARK OF STEEL | TEMPERED MARTENSITE | FRESH MARTENSITE | BAINITE | TOTAL | NUMBER DENSITY T (pieces/μm²) | PROPORTION M | T × M | HARDNESS (Hv) |
| 35 | g | 100 | 0 | 0 | 100 | 0.9 | 1.0 | 0.90 | 770 |
| 36 | g | 20 | 0 | 0 | <u>20</u> | 0.5 | 0.5 | <u>0.25</u> | 580 |
| 37 | g | 70 | 0 | 0 | <u>70</u> | 0.5 | 0.4 | <u>0.20</u> | 630 |
| 38 | g | 100 | 0 | 0 | 100 | 0.4 | 1.0 | <u>0.40</u> | 640 |
| 39 | g | 100 | 0 | 0 | 100 | 0.7 | 0.5 | <u>0.35</u> | 690 |
| 40 | g | 100 | 0 | 0 | 100 | 0.5 | 0.8 | <u>0.40</u> | 700 |
| 41 | g | 100 | 0 | 0 | 100 | 0.4 | 0.8 | <u>0.32</u> | 740 |
| 42 | g | 100 | 0 | 0 | 100 | 0.5 | 0.9 | <u>0.45</u> | 600 |
| 43 | g | 100 | 0 | 0 | 100 | 0.4 | 0.8 | <u>0.32</u> | 690 |
| 44 | g | 100 | 0 | 0 | 100 | 0.5 | 0.9 | <u>0.45</u> | 610 |
| 45 | g | 100 | 0 | 0 | 100 | 0.8 | 0.9 | 0.72 | 770 |
| 46 | g | 100 | 0 | 0 | 100 | 0.9 | 0.8 | 0.72 | 770 |
| 47 | g | 100 | 0 | 0 | 100 | 0.9 | 0.9 | 0.81 | 760 |
| 48 | g | 20 | 0 | 0 | <u>20</u> | 0.5 | 0.5 | <u>0.25</u> | 560 |
| 49 | g | 70 | 0 | 0 | <u>70</u> | 0.5 | 0.4 | <u>0.20</u> | 610 |
| 50 | g | 100 | 0 | 0 | 100 | 0.4 | 1.0 | <u>0.40</u> | 630 |
| 51 | g | 100 | 0 | 0 | 100 | 0.8 | 0.5 | <u>0.40</u> | 670 |
| 52 | g | 100 | 0 | 0 | 100 | 0.5 | 0.8 | <u>0.40</u> | 680 |
| 53 | g | 100 | 0 | 0 | 100 | 0.4 | 0.8 | <u>0.32</u> | 630 |
| 54 | g | 100 | 0 | 0 | 100 | 0.5 | 0.8 | <u>0.40</u> | 580 |
| 55 | g | 100 | 0 | 0 | 100 | 0.4 | 0.8 | <u>0.32</u> | 680 |
| 56 | g | 100 | 0 | 0 | 100 | 0.5 | 0.9 | <u>0.45</u> | 590 |
| 57 | h | 100 | 0 | 0 | 100 | 1.0 | 1.0 | 1.00 | 730 |
| 58 | h | 100 | 0 | 0 | 100 | 0.9 | 0.9 | 0.81 | 740 |
| 59 | h | 100 | 0 | 0 | 100 | 0.9 | 0.8 | 0.72 | 740 |
| 60 | h | 100 | 0 | 0 | 100 | 0.9 | 1.0 | 0.90 | 740 |
| 61 | h | 100 | 0 | 0 | 100 | 0.9 | 0.9 | 0.81 | 730 |

TABLE 5-continued

| | | | | | | | | |
|---|---|---|---|---|---|---|---|---|
| 62 | h | 100 | 0 | 0 | 100 | 0.9 | 0.8 | 0.72 | 730 |
| 63 | h | 100 | 0 | 0 | 100 | 0.9 | 1.0 | 0.90 | 730 |
| 64 | h | 100 | 0 | 0 | 100 | 0.9 | 0.9 | 0.81 | 740 |
| 65 | h | 100 | 0 | 0 | 100 | 0.8 | 0.9 | 0.72 | 740 |
| 66 | h | 100 | 0 | 0 | 100 | 0.9 | 1.0 | 0.90 | 740 |
| 67 | h | 100 | 0 | 0 | 100 | 0.8 | 0.9 | 0.72 | 730 |
| 68 | h | 100 | 0 | 0 | 100 | 0.9 | 0.9 | 0.81 | 730 |

| | HOT STAMP MOLDED BODY | | | | | |
|---|---|---|---|---|---|---|
| TEST No. | COARSE CARBIDE | PRIOR Y GRAIN | TENSILE STRENGTH | VICKERS HARDNESS (hV) | LOW FRACTURE STRESS | REMARK |
| 35 | ABSENCE | FINE | 2790 | 830 | ABSENCE | INVENTION EXAMPLE |
| 36 | PRESENCE | COURSE | 1250 | 830 | PRESENCE | COMPARATIVE EXAMPLE |
| 37 | PRESENCE | COURSE | 1210 | 840 | PRESENCE | COMPARATIVE EXAMPLE |
| 38 | ABSENCE | COURSE | 1660 | 830 | PRESENCE | COMPARATIVE EXAMPLE |
| 39 | ABSENCE | COURSE | 1700 | 830 | PRESENCE | COMPARATIVE EXAMPLE |
| 40 | ABSENCE | COURSE | 1690 | 830 | PRESENCE | COMPARATIVE EXAMPLE |
| 41 | ABSENCE | COURSE | 1670 | 850 | PRESENCE | COMPARATIVE EXAMPLE |
| 42 | ABSENCE | COURSE | 1680 | 830 | PRESENCE | COMPARATIVE EXAMPLE |
| 43 | ABSENCE | COURSE | 1680 | 840 | PRESENCE | COMPARATIVE EXAMPLE |
| 44 | ABSENCE | COURSE | 1670 | 850 | PRESENCE | COMPARATIVE EXAMPLE |
| 45 | ABSENCE | FINE | 2800 | 820 | ABSENCE | INVENTION EXAMPLE |
| 46 | ABSENCE | FINE | 2810 | 830 | ABSENCE | INVENTION EXAMPLE |
| 47 | ABSENCE | FINE | 2810 | 820 | ABSENCE | INVENTION EXAMPLE |
| 48 | PRESENCE | COURSE | 1230 | 810 | PRESENCE | COMPARATIVE EXAMPLE |
| 49 | PRESENCE | COURSE | 1210 | 820 | PRESENCE | COMPARATIVE EXAMPLE |
| 50 | ABSENCE | COURSE | 1650 | 810 | PRESENCE | COMPARATIVE EXAMPLE |
| 51 | ABSENCE | COURSE | 1700 | 820 | PRESENCE | COMPARATIVE EXAMPLE |
| 52 | ABSENCE | COURSE | 1670 | 830 | PRESENCE | COMPARATIVE EXAMPLE |
| 53 | ABSENCE | COURSE | 1680 | 830 | PRESENCE | COMPARATIVE EXAMPLE |
| 54 | ABSENCE | COURSE | 1660 | 830 | PRESENCE | COMPARATIVE EXAMPLE |
| 55 | ABSENCE | COURSE | 1690 | 820 | PRESENCE | COMPARATIVE EXAMPLE |
| 56 | ABSENCE | COURSE | 1680 | 830 | PRESENCE | COMPARATIVE EXAMPLE |
| 57 | ABSENCE | FINE | 2060 | 880 | PRESENCE | INVENTION EXAMPLE |

TABLE 5-continued

| | | | | | | |
|---|---|---|---|---|---|---|
| 58 | ABSENCE | FINE | 2080 | 880 | PRESENCE | INVENTION EXAMPLE |
| 59 | ABSENCE | FINE | 2100 | 870 | PRESENCE | INVENTION EXAMPLE |
| 60 | ABSENCE | FINE | 2060 | 880 | PRESENCE | INVENTION EXAMPLE |
| 61 | ABSENCE | FINE | 2070 | 870 | PRESENCE | INVENTION EXAMPLE |
| 62 | ABSENCE | FINE | 2090 | 880 | PRESENCE | INVENTION EXAMPLE |
| 63 | ABSENCE | FINE | 2070 | 880 | PRESENCE | INVENTION EXAMPLE |
| 64 | ABSENCE | FINE | 2070 | 880 | PRESENCE | INVENTION EXAMPLE |
| 65 | ABSENCE | FINE | 2100 | 870 | PRESENCE | INVENTION EXAMPLE |
| 66 | ABSENCE | FINE | 2070 | 870 | PRESENCE | INVENTION EXAMPLE |
| 67 | ABSENCE | FINE | 2080 | 880 | PRESENCE | INVENTION EXAMPLE |
| 68 | ABSENCE | FINE | 2090 | 880 | PRESENCE | INVENTION EXAMPLE |

As presented in Table 4 and Table 5, in invention examples in ranges of the present invention (tests No. 1 to No. 7, No. 10 to No. 11, No. 20 to No. 23, No. 33 to No. 35, No. 45 to No. 47, No. 57 to No. 58), in the hot stamp formed bodies, the low-stress fracture did not occur, or even though it occurred, the stress in which a fracture occurred was 1800 MPa or more.

In a test No. 8, a heating temperature of cold-rolled sheet annealing was too low, so that a total area fraction of bainite, fresh martensite and tempered martensite fell short, a product (T×M) fell short, a low-stress fracture occurred, and sufficient tensile strength was not able to be obtained. In a test No. 9, a heating time of cold-rolled sheet annealing was too short, so that a total area fraction of bainite, fresh martensite and tempered martensite fell short, a product (T×M) fell short, a low-stress fracture occurred, and sufficient tensile strength was not able to be obtained. In a test No. 12, a cooling stop temperature of cold-rolled sheet annealing was too high, so that a product (T×M) fell short, a low-stress fracture occurred, and sufficient tensile strength was not able to be obtained. In a test No. 13, an average cooling rate in a first temperature zone was too low, so that a product (T×M) fell short, a low-stress fracture occurred, and sufficient tensile strength was not able to be obtained. In a test No. 14, an average cooling rate in a second temperature zone was too low, so that a product (T×M) fell short, a low-stress fracture occurred, and sufficient tensile strength was not able to be obtained. In a test No. 15, a reheating temperature in heat treatment was too low, so that a product (T×M) fell short, a low-stress fracture occurred, and sufficient tensile strength was not able to be obtained. In a test No. 16, a reheating temperature in heat treatment was too high, so that a product (T×M) fell short, a low-stress fracture occurred, and sufficient tensile strength was not able to be obtained. In a test No. 17, a reheating time in heat treatment was too short, so that a product (T×M) fell short, a low-stress fracture occurred, and sufficient tensile strength was not able to be obtained. In a test No. 18, a reheating time in heat treatment was too long, so that a product (T×M) fell short, a low-stress fracture occurred, and sufficient tensile strength was not able to be obtained. In a test No. 19, no heat treatment was performed, so that a product (T×M) fell short, a low-stress fracture occurred, and sufficient tensile strength was not able to be obtained.

In a test No. 24, a heating temperature of cold-rolled sheet annealing was too low, so that a total area fraction of bainite, fresh martensite and tempered martensite fell short, a product (T×M) fell short, a low-stress fracture occurred, and sufficient tensile strength was not able to be obtained. In a test No. 25, a heating time of cold-rolled sheet annealing was too short, so that a total area fraction of bainite, fresh martensite and tempered martensite fell short, a product (T×M) fell short, a low-stress fracture occurred, and sufficient tensile strength was not able to be obtained. In a test No. 26, a cooling stop temperature of cold-rolled sheet annealing was too high, so that a product (T×M) fell short, a low-stress fracture occurred, and sufficient tensile strength was not able to be obtained. In a test No. 27, an average cooling rate in the first temperature zone was too low, so that a product (T×M) fell short, a low-stress fracture occurred, and sufficient tensile strength was not able to be obtained. In a test No. 28, an average cooling rate in the second temperature zone was too low, so that a product (T×M) fell short, a low-stress fracture occurred, and sufficient tensile strength was not able to be obtained. In a test No. 29, a reheating temperature in heat treatment was too low, so that a product (T×M) fell short, a low-stress fracture occurred, and sufficient tensile strength was not able to be obtained. In a test No. 30, a reheating temperature in heat treatment was too high, so that a product (T×M) fell short, a low-stress fracture occurred, and sufficient tensile strength was not able to be obtained. In a test No. 31, a reheating time in heat treatment was too short, so that a product (T×M) fell short, a low-stress fracture occurred, and sufficient tensile strength was not able to be obtained. In a test No. 32, a reheating time in heat treatment was too long, so that a product (T×M) fell short, a low-stress fracture occurred, and sufficient tensile strength was not able to be obtained.

In a test No. 36, a heating temperature of cold-rolled sheet annealing was too low, so that a total area fraction of bainite, fresh martensite and tempered martensite fell short, a product (T×M) fell short, a low-stress fracture occurred, and sufficient tensile strength was not able to be obtained. In a test No. 37, a heating time of cold-rolled sheet annealing was too short, so that a total area fraction of bainite, fresh martensite and tempered martensite fell short, a product (T×M) fell short, a low-stress fracture occurred, and sufficient tensile strength was not able to be obtained. In a test No. 38, a cooling stop temperature of cold-rolled sheet annealing was too high, so that a product (T×M) fell short, a low-stress fracture occurred, and sufficient tensile strength was not able to be obtained. In a test No. 39, an average cooling rate in the first temperature zone was too low, so that a product (T×M) fell short, a low-stress fracture occurred, and sufficient tensile strength was not able to be obtained. In a test No. 40, an average cooling rate in the second temperature zone was too low, so that a product (T×M) fell short, a low-stress fracture occurred, and sufficient tensile strength was not able to be obtained. In a test No. 41, a reheating temperature in heat treatment was too low, so that a product (T×M) fell short, a low-stress fracture occurred, and sufficient tensile strength was not able to be obtained. In a test No. 42, a reheating temperature in heat treatment was too high, so that a product (T×M) fell short, a low-stress fracture occurred, and sufficient tensile strength was not able to be obtained. In a test No. 43, a reheating time in heat treatment was too short, so that a product (T×M) fell short, a low-stress fracture occurred, and sufficient tensile strength was not able to be obtained. In a test No. 44, a reheating time in heat treatment was too long, so that a product (T×M) fell short, a low-stress fracture occurred, and sufficient tensile strength was not able to be obtained.

In a test No. 48, a heating temperature of cold-rolled sheet annealing was too low, so that a total area fraction of bainite, fresh martensite and tempered martensite fell short, a product (T×M) fell short, a low-stress fracture occurred, and sufficient tensile strength was not able to be obtained. In a test No. 49, a heating time of cold-rolled sheet annealing was too short, so that a total area fraction of bainite, fresh martensite and tempered martensite fell short, a product (T×M) fell short, a low-stress fracture occurred, and sufficient tensile strength was not able to be obtained. In a test No. 50, a cooling stop temperature of cold-rolled sheet annealing was too high, so that a product (T×M) fell short, a low-stress fracture occurred, and sufficient tensile strength was not able to be obtained. In a test No. 51, an average cooling rate in the first temperature zone was too low, so that a product (T×M) fell short, a low-stress fracture occurred, and sufficient tensile strength was not able to be obtained. In a test No. 52, an average cooling rate in the second temperature zone was too low, so that a product (T×M) fell short, a low-stress fracture occurred, and sufficient tensile strength was not able to be obtained. In a test No. 53, a reheating temperature in heat treatment was too low, so that a product (T×M) fell short, a low-stress fracture occurred, and sufficient tensile strength was not able to be obtained. In a test No. 54, a reheating temperature in heat treatment was too high, so that a product (T×M) fell short, a low-stress fracture occurred, and sufficient tensile strength was not able to be obtained. In a test No. 55, a reheating time in heat treatment was too short, so that a product (T×M) fell short, a low-stress fracture occurred, and sufficient tensile strength was not able to be obtained. In a test No. 56, a reheating time in heat treatment was too long, so that a product (T×M) fell short, a low-stress fracture occurred, and sufficient tensile strength was not able to be obtained.

Second Experiment

In a second experiment, cold-rolled steel sheets were obtained in manners similar to those in the tests No. 57, No. 60, No. 63 and No. 66 in the first experiment, and two-time cold-rolled sheet annealing, heat treatment (reheating) and hardening of the cold-rolled steel sheets were performed. Table 6 presents conditions of the first cold-rolled sheet annealing, conditions of the second cold-rolled sheet annealing, conditions of heat treatment (reheating) and a condition of hardening. Thus, various hot stamp formed bodies were manufactured.

TABLE 6

| | | | FIRST COLD-ROLLED SHEET ANNEALING | SECOND COLD-ROLLED SHEET ANNEALING | | | |
|---|---|---|---|---|---|---|---|
| TEST No. | MARK OF STEEL | STEEL TYPE | HEAT TREATMENT (REHEATING), HARDENING | Ac3 POINT (° C.) | HEATING TEMPERATURE (° C.) | HEATING TIME (sec) | COOLING STOP TEMPERATURE (° C.) |
| 71 | h | COLD-ROLLED STEEL SHEET | SAME AS TEST No. 57 | 829 | 902 | 10 | −177 |
| 72 | h | COLD-ROLLED STEEL SHEET | SAME AS TEST No. 57 | 829 | 901 | 5 | −177 |
| 73 | h | COLD-ROLLED STEEL SHEET | SAME AS TEST No. 57 | 829 | 904 | 1 | −178 |
| 74 | h | ALUMINUM-PLATED STEEL SHEET | SAME AS TEST No. 60 | 829 | 903 | 150 | −177 |
| 75 | h | ALUMINUM-PLATED STEEL SHEET | SAME AS TEST No. 60 | 829 | 901 | 5 | −178 |

TABLE 6-continued

| 76 | h | ALUMINUM-PLATED STEEL SHEET | SAME AS TEST No. 60 | 829 | 903 | 1 | −180 |
| --- | --- | --- | --- | --- | --- | --- | --- |
| 77 | h | HOT-DIP GALVANIZED STEEL SHEET | SAME AS TEST No. 63 | 829 | 904 | 150 | −180 |
| 78 | h | HOT-DIP GALVANIZED STEEL SHEET | SAME AS TEST No. 63 | 829 | 904 | 5 | −179 |
| 79 | h | HOT-DIP GALVANIZED STEEL SHEET | SAME AS TEST No. 63 | 829 | 903 | 1 | −177 |
| 80 | h | ALLOYED HOT-DIP GALVANIZED STEEL SHEET | SAME AS TEST No. 66 | 829 | 901 | 150 | −176 |
| 81 | h | ALLOYED HOT-DIP GALVANIZED STEEL SHEET | SAME AS TEST No. 66 | 829 | 902 | 5 | −176 |
| 82 | h | ALLOYED HOT-DIP GALVANIZED STEEL SHEET | SAME AS TEST No. 66 | 829 | 901 | 1 | −175 |

| | SECOND COLD-ROLLED SHEET ANNEALING | | | | |
| --- | --- | --- | --- | --- | --- |
| | AVERAGE COOLING | AVERAGE COOLING | HEAT TREATMENT (REHEEATING) | | |
| TEST No. | RATE IN FIRST TEMPERATURE ZONE (° C./sec) | RATE IN SECOND TEMPERATURE ZONE (° C./sec) | REHEATING TEMPERATURE (° C.) | REHEATING TIME (min) | REMARK |
| 71 | 2011 | 101 | 115 | 65 | FOR INVENTION EXAMPLE |
| 72 | 2032 | 135 | 115 | 65 | FOR INVENTION EXAMPLE |
| 73 | 1963 | 55 | 115 | 65 | FOR INVENTION EXAMPLE |
| 74 | 1969 | 106 | 115 | 65 | FOR INVENTION EXAMPLE |
| 75 | 2033 | 122 | 115 | 65 | FOR INVENTION EXAMPLE |
| 76 | 2268 | 100 | 115 | 65 | FOR INVENTION EXAMPLE |

TABLE 6-continued

| | | | | | |
|---|---|---|---|---|---|
| 77 | 2059 | 135 | 115 | 65 | FOR INVENTION EXAMPLE |
| 78 | 2054 | 138 | 115 | 65 | FOR INVENTION EXAMPLE |
| 79 | 1945 | 139 | 115 | 65 | FOR INVENTION EXAMPLE |
| 80 | 2168 | 101 | 115 | 65 | FOR INVENTION EXAMPLE |
| 81 | 1956 | 98 | 115 | 65 | FOR INVENTION EXAMPLE |
| 82 | 2085 | 129 | 115 | 65 | FOR INVENTION EXAMPLE |

Then, steel structures of the steel sheets for hot stamping and steel structures of the hot stamp formed bodies were observed. Table 7 presents these results. An observation method of the steel structures is as described above. Further, a tensile test was performed in a manner similar to that in the first experiment. Table 7 also presents this result.

TABLE 7

| | | STEEL SHEET FOR HOT STAMPING | | | | | | | |
|---|---|---|---|---|---|---|---|---|---|
| | | AREA FRACTION (%) | | | | | | | VICKERS |
| TEST No. | MARK OF STEEL | TEMPERED MARTEN-SITE | FRESH MARTEN-SITE | BAINITE | TOTAL | NUMBER DENSITY T (pieces/μm²) | PROPOR-TION M | T × M | HARD-NESS (Hv) |
| 71 | h | 100 | 0 | 0 | 100 | 1.0 | 1.0 | 1.00 | 720 |
| 72 | h | 100 | 0 | 0 | 100 | 0.9 | 0.9 | 0.81 | 730 |
| 73 | h | 100 | 0 | 0 | 100 | 0.9 | 0.8 | 0.72 | 730 |
| 74 | h | 100 | 0 | 0 | 100 | 0.9 | 1.0 | 0.90 | 730 |
| 75 | h | 100 | 0 | 0 | 100 | 0.9 | 0.8 | 0.72 | 730 |
| 76 | h | 100 | 0 | 0 | 100 | 0.9 | 0.9 | 0.81 | 720 |
| 77 | h | 100 | 0 | 0 | 100 | 0.9 | 1.0 | 0.90 | 720 |
| 78 | h | 100 | 0 | 0 | 100 | 0.9 | 0.9 | 0.81 | 730 |
| 79 | h | 100 | 0 | 0 | 100 | 0.8 | 0.8 | 0.64 | 730 |
| 80 | h | 100 | 0 | 0 | 100 | 0.9 | 1.0 | 0.90 | 730 |
| 81 | h | 100 | 0 | 0 | 100 | 0.8 | 0.9 | 0.72 | 720 |
| 82 | h | 100 | 0 | 0 | 100 | 0.9 | 0.8 | 0.72 | 720 |

| | HOT STAMP MOLDED BODY | | | | | |
|---|---|---|---|---|---|---|
| TEST No. | COARSE CARBIDE | PRIOR Y GRAIN | TENSILE STRENGTH | VICKERS HARD-NESS (hV) | LOW FRACTURE STRESS | REMARK |
| 71 | ABSENCE | FINE | 2120 | 870 | PRESENCE | INVENTION EXAMPLE |
| 72 | ABSENCE | FINE | 2150 | 880 | PRESENCE | INVENTION EXAMPLE |
| 73 | ABSENCE | FINE | 2170 | 870 | PRESENCE | INVENTION EXAMPLE |
| 74 | ABSENCE | FINE | 2140 | 880 | PRESENCE | INVENTION EXAMPLE |
| 75 | ABSENCE | FINE | 2150 | 870 | PRESENCE | INVENTION EXAMPLE |
| 76 | ABSENCE | FINE | 2150 | 870 | PRESENCE | INVENTION EXAMPLE |
| 77 | ABSENCE | FINE | 2170 | 880 | PRESENCE | INVENTION EXAMPLE |
| 78 | ABSENCE | FINE | 2140 | 870 | PRESENCE | INVENTION EXAMPLE |
| 79 | ABSENCE | FINE | 2170 | 870 | PRESENCE | INVENTION EXAMPLE |

TABLE 7-continued

| | | | | | | |
|---|---|---|---|---|---|---|
| 80 | ABSENCE | FINE | 2140 | 870 | PRESENCE | INVENTION EXAMPLE |
| 81 | ABSENCE | FINE | 2150 | 880 | PRESENCE | INVENTION EXAMPLE |
| 82 | ABSENCE | FINE | 2150 | 870 | PRESENCE | INVENTION EXAMPLE |

As presented in Table 7, in any invention example, a smaller prior γ grain diameter and a more excellent mechanical property were obtained than those in the invention examples (tests No. 57, No. 60, No. 63 or No. 66) in each of which one-time cold-rolled sheet annealing was performed.

INDUSTRIAL APPLICABILITY

The present invention can be utilized in, for example, industries related to a steel sheet for hot stamp formed body suitable for automotive parts.

The invention claimed is:

1. A steel sheet for hot stamping comprising
a steel structure comprising
an area fraction of bainite, fresh martensite and tempered martensite: 80% or more in total, and
a product of a number density of carbides, in pieces/$\mu m^2$, and a proportion of carbides precipitated into prior austenite grains in carbides: 0.50 or more and 10 or less.

2. The steel sheet for hot stamping according to claim 1, wherein a C content is not less than 0.27 mass % nor more than 0.60 mass %.

3. The steel sheet for hot stamping according to claim 1, wherein a Vickers hardness is 500 Hv or more.

4. The steel sheet for hot stamping according to claim 2, wherein a Vickers hardness is 500 Hv or more.

5. The steel sheet for hot stamping according to claim 1, comprising a plating layer.

6. The steel sheet for hot stamping according to claim 2, comprising a plating layer.

7. The steel sheet for hot stamping according to claim 3, comprising a plating layer.

8. The steel sheet for hot stamping according to claim 4, comprising a plating layer.

\* \* \* \* \*